United States Patent [19]

Morgan, Jr.

[11] 4,081,307

[45] Mar. 28, 1978

[54] PROCESS FOR BINDING BRAKE LININGS

[75] Inventor: Thomas E. Morgan, Jr., Bloomfield Hills, Mich.

[73] Assignee: Leonard Friedman, Beverly Hills, Calif.

[21] Appl. No.: 820,375

[22] Filed: Jul. 29, 1977

Related U.S. Application Data

[63] Continuation-in-part of Ser. No. 662,725, Mar. 1, 1976, abandoned.

[51] Int. Cl.² .................... B29C 19/02; B65C 9/25
[52] U.S. Cl. .................... 156/272; 156/322; 427/55; 427/314; 427/374 B
[58] Field of Search ............... 156/272, 322, 497, 499; 427/314, 316, 317, 318, 55, 374 B; 118/641

[56] References Cited

U.S. PATENT DOCUMENTS

| | | | |
|---|---|---|---|
| 2,520,978 | 9/1950 | Super | 156/272 |
| 2,642,919 | 6/1953 | Kingman | 156/272 |
| 2,668,364 | 2/1954 | Colton | 156/272 |
| 3,498,820 | 3/1970 | Hawkins | 427/314 |

*Primary Examiner*—Douglas J. Drummond
*Attorney, Agent, or Firm*—Barnes, Kisselle, Raisch & Choate

[57] ABSTRACT

A pre-bond process for brake linings which includes a curing process by the application of infrared heat for a short period of time to prepare the surface of the molded brake linings, after which the bonding material is applied to the brake shoes or tables, and high pressure applied during a further curing process to set the bonding material.

5 Claims, No Drawings

PROCESS FOR BINDING BRAKE LININGS

This application is a continuation-in-part of my co-pending application entitled "Process for Bonding Brake Linings," Ser. No. 662,725, filed Mar. 1, 1976 now abandoned.

This invention relates to a Process for Bonding Brake Linings.

HISTORY OF THE ART

For many years brake linings, formed of a relatively hard, long-wearing friction material, have been applid to brake shoes or brake tables, as they are sometimes called. These linings are curved in shape and, in operation, are forced against the inside of a brake drum by a mechanical, hydraulic, or pneumatic pressure to brake the rotative movement of a vehicle wheel carrying the drum.

It has been most usual, throughout the history of the automobile, that these linings be fastened to the brake shoes by rivets made of copper or brass. The rivets are set into the lining so that a considerable amount of wear can take place before the rivets can contact the brake drum. Even though the rivets were made of a relatively soft material, it was still possible that the wear surface of the drum would be scored by the rivets as the linings wore away. This would require a turning of the brake drum, that is, a machining of the interior wear surface of the drum to provide a smooth surface when linings were replaced to prevent undue wear and damage to the new linings.

In recent years, while riveted linings are still in use, it has been the practice to bond brake linings by an adhesive to the brake shoes. Thus, no rivets were used and the linings can be used to a greater percentage of the total thickness without danger of damage to the brake drums. This was also an economy since inspection and replacement could be less frequent.

Patents which describe apparatus and processes for accomplishing this bonding are:

No. 3,638,560 Feb. 1, 1972 Morgan et al
No. 3,752,062 Aug. 14, 1973 Morgan et al
No. 3,881,982 May 6, 1975 Morgan et al Clearly, the bonding process must be effective in order to prevent accidental dislodgement and a dangerous brake condition. Proper bonding material, high pressure application, and heat have the main considerations. Pressures up to 200 pounds per squar inch are used on passenger car brake drums, and, for heavy duty commercial truck and military vehicles, pressures up to 2500 pounds per square inch have been used together with an effective bonding agent and a heat treatment in the areas of 400° F. to 500° F.

OBJECTS OF THE PRESENT INVENTION

The present invention is directed to a discovery that the bonding process can be markedly improved by a preheating or curing of the brake linings prior to the time that they are applied to the brake shoes. The heating is primarily of the inner or bonding surface and is accomplished rather quickly in a continuous process.

Tests have shown that the linings bonded with the present system to be disclosed herein have much higher shear load test results and practically no bond failure as compared to almost complete bond failure for linings applied in the usual way.

DESCRIPTION OF THE PRESENT INVENTION

Brake lining material is a molded product which is made generally of the following materials***

Rubber
Coal or Carbon
Asbestos (50% or more)
Brass or zinc chip
Phenolic resin
Cashew nut oil
Various binders, fillers, and resins

***Manufacturers include
H. K. Porter, Inc. — Product 1106, 1107
Raybestos—Manhattan, Inc.
Carlisle Corp. — Product MMD39, MM243, 8C5
Abex Corp. — Product 305, 306, 321
Maremont Corporation
World Bestos Company The lining material is received by the applicant's organization molded into proper size and shape and ready to be applied to a brake shoe. The brake shoe is a curved metal plate (the brake table) having the necessary mounting bars which fit particular brake constructions. The shoes and the linings are illustrated in the above-referenced patents. When large truck sizes are involved, the brake linings are usually split into two sections which are tapered from one end to the other in thickness.

The process to be described involves the treatment of the parts in the various stages which produce the finished brake shoe and bonded lining ready for assembly into a vehicle brake system.

The first step is the initial heating or cure of the linings. An infrared oven is set up having a tunnel about 15 to 20 feet in length. A conveyor is provided to move the brake linings through the oven. The linings are placed with the wear side (that is, the side not to be bonded), down on the conveyor. The bonding side is exposed directly to the infrared burner so that the heat penetrates directly into the surface. The conveyor is moved through the oven at a rate of about 15 to 20 feet per minute in accordance with one example of treatment.

The lining surface under these conditions reaches a temperature of about 600° F. and in a range of 500° F. to 700° F. The results of this treatment is a penetration of the heat about 0.030 of an inch. The moisture which may have been absorbed into the lining during shipment or storage is driven from the lining and any trapped gases or residual solvents in the bonding area are driven off which in turn seems to open up the porosity of the lining on the bonding side. The friction or wear side of the lining is not adversely affected in any way during this treatment. As one example, the treatment may last in the order of ½ minute to 2 minutes and preferably in a range of 45 seconds to 1 minute and 15 seconds. The treatment is believed to allow penetration of the bonding material to a greater depth without affecting the strength of the lining material.

The lining is then allowed to cool to the ambient temperature and immediately moved on a conveyor through a spray booth where the heat-setting bonding adhesive is applied. This adhesive may be Cycle Weld made by Chrysler. The adhesive is sprayed on at two spaced stations along the conveyor route to provide a uniform dry thickness of 0.030 inch. The lining is then allowed to air dry at ambient temperatures for about 24 to 48 hours.

Treatment as described above utilizing longer periods of treatment with a temperature which reaches a range from 300° F to 800° F with varying rates of travel through the oven are shown in examples as follows:

EXAMPLE 1

Initial Temperature: 200° F.
General Temperature Range: 300° to 500° F.
Travel Rate: 29½ inches per minute (IPM)
Elapsed Time: 5 minutes 15 seconds

EXAMPLE 2

Initial Temperature: 160° F.
General Temperature Range: 400° to 640° F.
Travel Rate: 21 inches per minute
Elapsed Time: 7 minutes 45 seconds

EXAMPLE 3

Initial Temperature: 160° F.
General Temperature Range: 340° to 660° F.
Travel Rate: 13 inches per minute
Elapsed Time: 10 minutes 45 seconds Thus, a temperature range of 300° to 800° F. is preferred with a time cycle varying from ½ minute to 11 or 12 minutes. As previously described, the lining is allowed to cool to the ambient temperatures and the treated surface then sprayed with the bonding adhesive and air dried for 24 to 48 hours.

After the air dry period, the lining is moved to a stage called the pre-stick stage. The metal shoes to which the linings are to be bonded are passed through an infrared oven on conveyors with the table, that is, the surface to which the linings is to be bonded, facing the burners. Any moisture or foreign matter on the shoe table will be evaporated or burned off. The two pieces of lining (assuming the double construction), are then placed with the bonding side up on a pressure machine called a pre-stick machine and the heated metal shoes are placed directly on top of the linings.

Suitable locator jigs or fixtures are provided to achieve proper registration of the shoes and the linings and then pressure is applied by the pre-stick machine to the extent of about 50 pounds per square inch for a period of 10 to 15 seconds.

This is sufficient to secure the linings in position on the metal brake shoes and this assembly is then placed in a pressure cage and a very high pressure applied in the area of 2150 pounds per square inch. The cage assembly is then sent to the curing oven where a temperature of 650° F. is maintained for a period of 45 minutes.

The apparatus for applying the final pressure and other details of the final curing process are to be found in referenced U.S. Pat. No. 3,881,982.

The above process utilizing the infrared preheat or curing stage has resulted in a much superior bond of lining to shoe table. A shear test in which a machine is devised to apply edge pressure to a lining to dislodge it from the shoe has shown much superior bonding in the process described. The following tables illustrate this.

| CURED LINING SAMPLES | | | | |
|---|---|---|---|---|
| Lining Code | Lining Mfg. | Shear Load | Bond Failure | Lining Failure |
| Com 306 | Abex | 68,000 | 0% | 100% |
| 8C5 | Carlisle | 60,000 | 0% | 100% |
| Com 305 | Abex | 66,000 | 0% | 100% |
| 8C5 | Carlisle | 74,000 | 0% | 100% |
| 1106 | Porter | 84,000 | 2% | 98% |

-continued

| CURED LINING SAMPLES | | | | |
|---|---|---|---|---|
| Lining Code | Lining Mfg. | Shear Load | Bond Failure | Lining Failure |
| Com 305 | Abex | 60,000 | .5% | 99.5% |

| UNCURED LINING SAMPLES | | | | |
|---|---|---|---|---|
| Lining Code | Lining Mfg. | Shear Load | Bond Failure | Lining Failure |
| Com 305 | Abex | 58,000 | 100% | 0% |
| Com 305 | Abex | 47,500 | 100% | 0% |
| 1106 | Porter | 39,750 | 100% | 0% |
| 1106 | Porter | 60,250 | 100% | 0% |
| MMD 16 | Carlisle | 55,000 | 95% | 5% |
| MM 243 | Carlisle | 50,000 | 90% | 10% |

I claim:
1. A method of bonding brake linings to a metallic brake shoe which comprises:
   (a) subjecting the inner side of the brake linings to intense preheat in a range of 500° to 700° F. for a period of 45 to 75 seconds to remove moisture and trapped gases in a thin layer at the heated surface,
   (b) cooling the linings to about ambient temperature,
   (c) spraying a heat-setting bonding material on the inner side of said linings,
   (d) applying said inner side of a said linings to a metallic brake table surface under pressure to pre-stick the linings in place,
   (e) applying a high pressure to said linings relative to said table surface in the range of 2000 pounds per square inch, and
   (f) heating said linings and brake tables to a temperature in the neighborhood of 650° F. for about 45 minutes to set the heat-setting bonding material.
2. A method of bonding brake linings to a metallic brake shoe as defined in claim 1 in which:
   (a) the brake table surface is heated and cleaned prior to the pre-stick step.
3. A method of bonding brake linings to a metallic brake shoe as defined in claim 1 in which:
   (a) the preheat is accomplished by passing the linings through an infrared oven with the inner side of the linings exposed.
4. In a method of bonding brake linings to a metallic brake shoe in which the linings are bonded to the shoe by a heat-setting bonding material under conditions of pressure and heat, that improvement which comprises:
   (a) preheating the surface of the inner side of the linings, to a temperature of about 300° to 800° F., by subjecting the linings to infrared burners for a period ranging from ½ minute to 12 minutes,
   (b) cooling the linings to ambient temperatures, and
   (c) spraying the inner side of the linings with a heat-setting bonding material prior to the application of the final pressure and heat stage.
5. In a method of bonding brake linings to a metallic brake shoe in which the linings are bonded to the shoe by a heat-setting bonding material under conditions of pressure and heat, that improvement which comprises:
   (a) passing the linings through an infrared oven with the inner side of the lining exposed,
   (b) preheating the surface of the inner side of the linings to a temperature of about 300° F. to 800° F. by subjecting the inner sides to infrared heat for a period of ½ minute to 12 minutes,
   (c) cooling the linings to ambient temperatures, and
   (d) spraying the inner side of the linings with a heat-setting bonding material prior to the application of the final pressure and heat stage.

* * * * *